March 10, 1936. A. R. PRIBIL 2,033,298
TRAILER
Filed Oct. 15, 1934  3 Sheets-Sheet 1
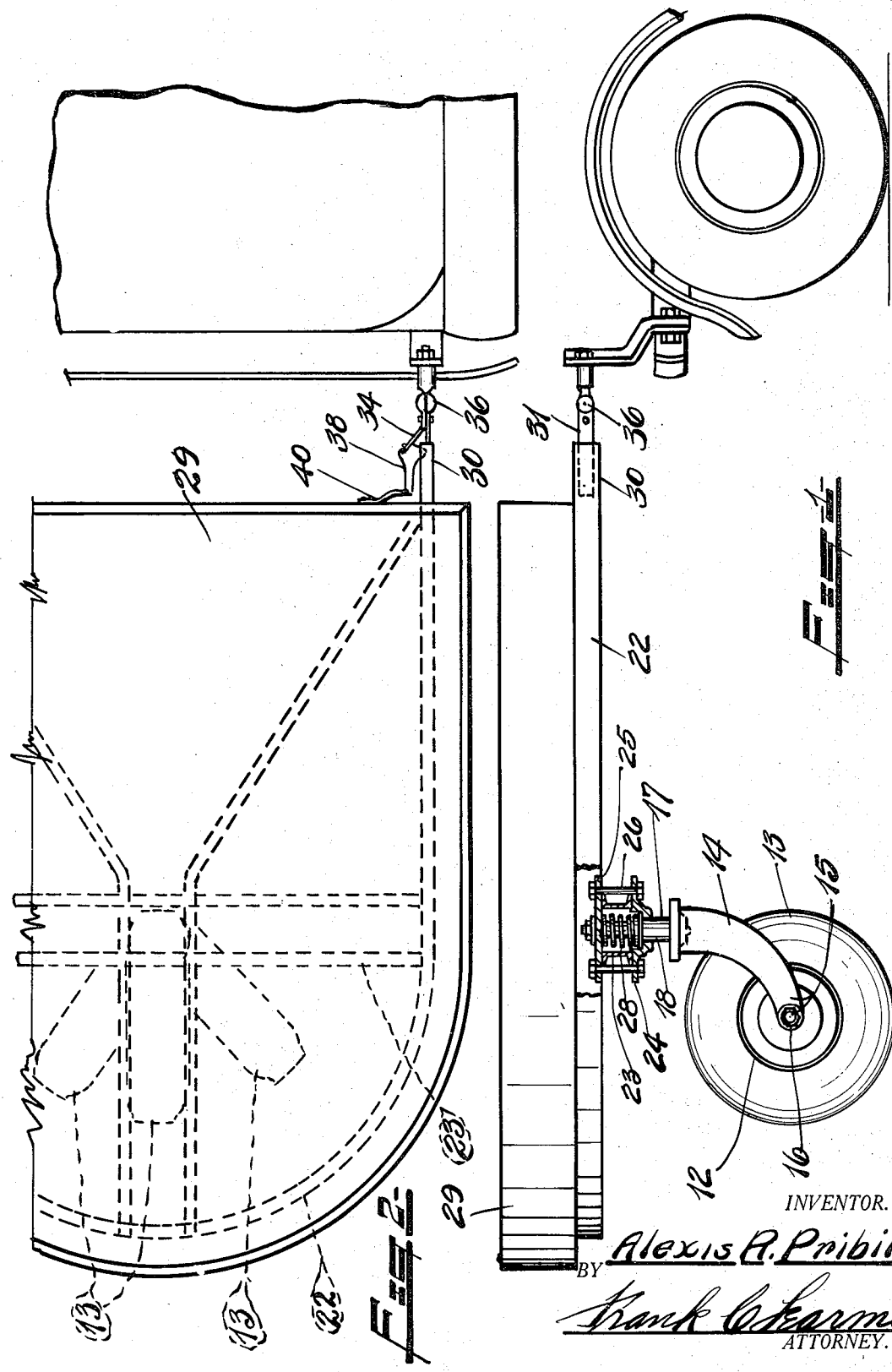
INVENTOR.
Alexis R. Pribil
BY Frank C. Karman
ATTORNEY.

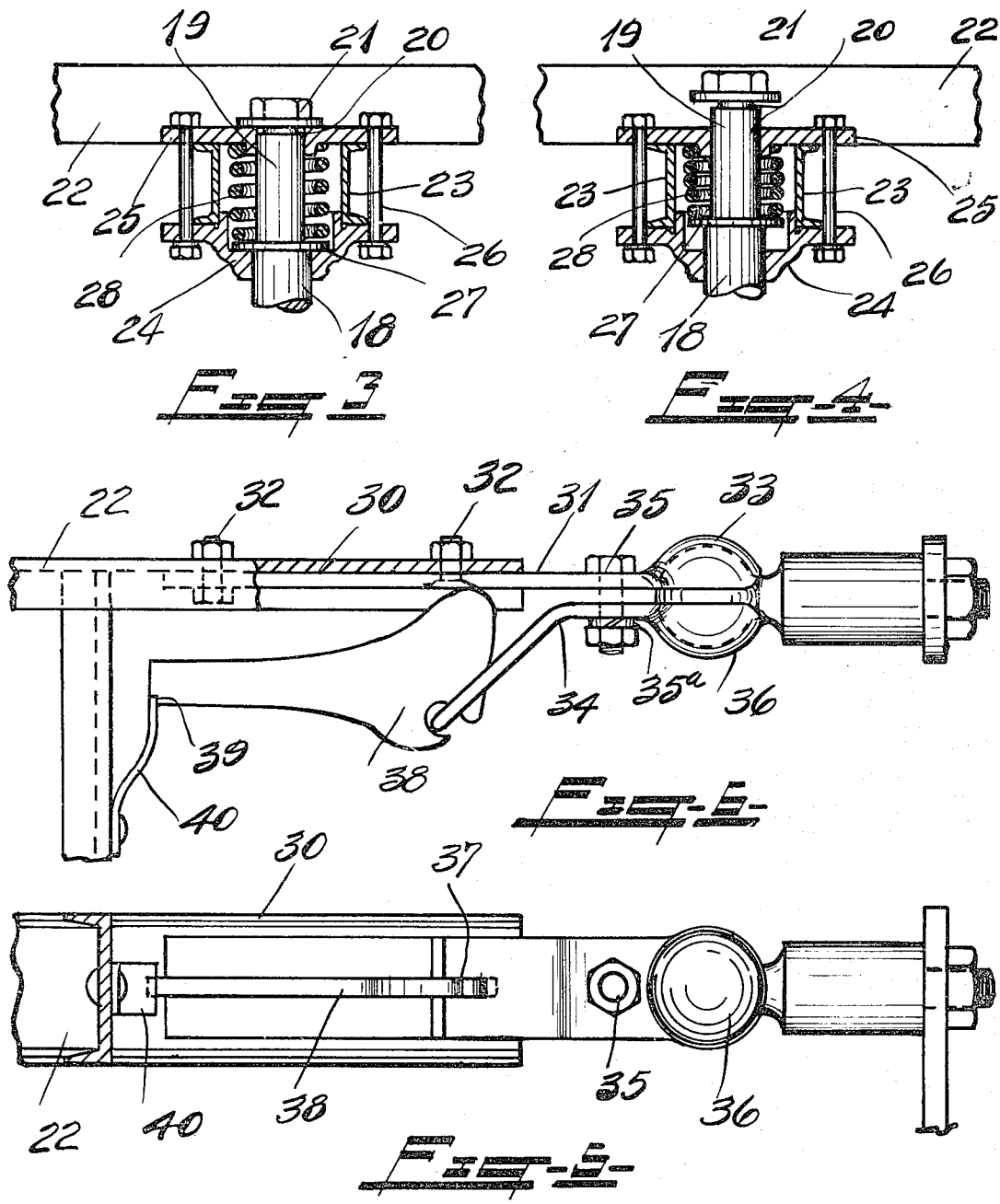

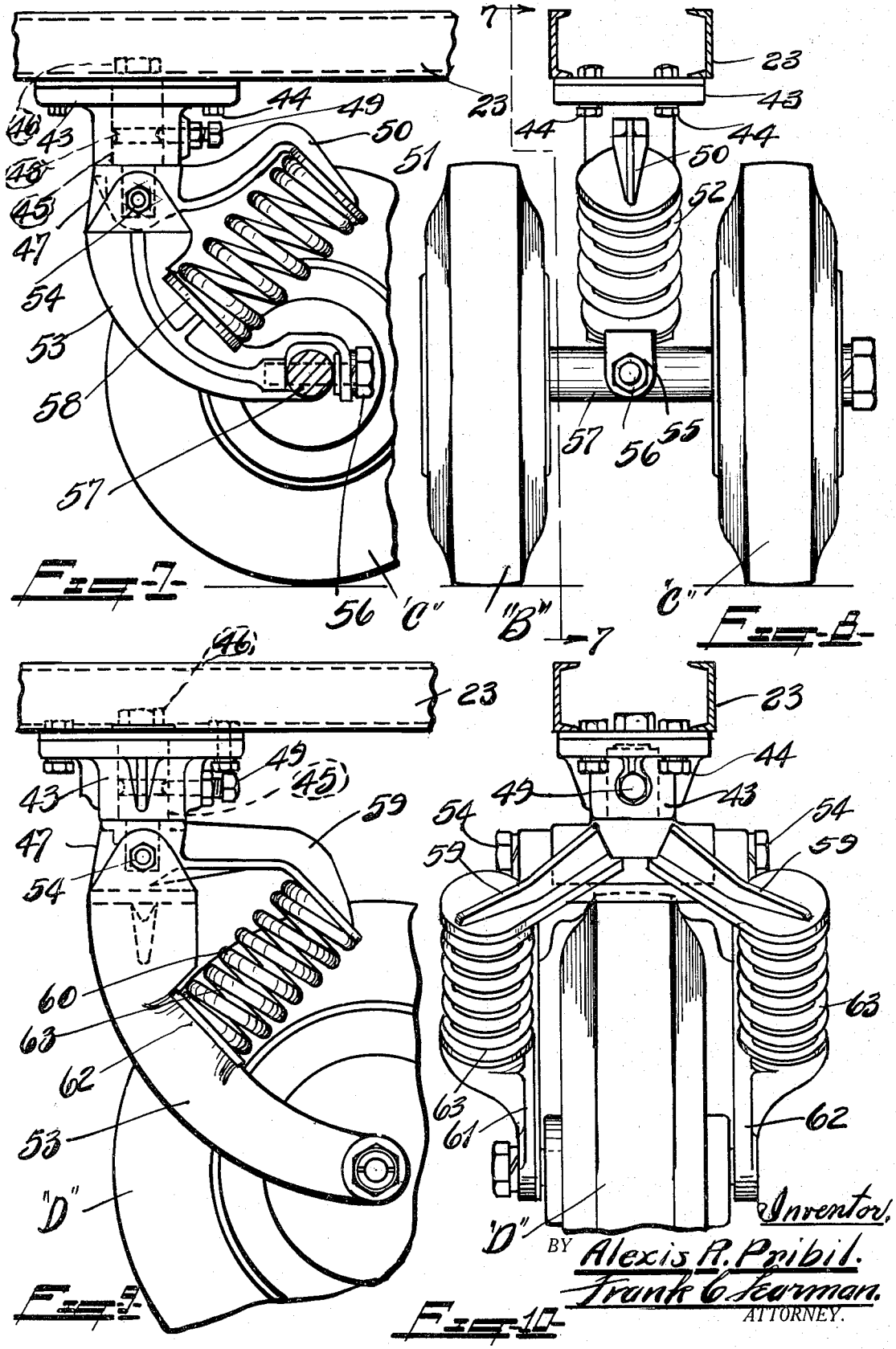

Patented Mar. 10, 1936

2,033,298

UNITED STATES PATENT OFFICE 2,033,298

TRAILER

Alexis R. Pribil, Saginaw, Mich.

Application October 15, 1934, Serial No. 748,329

8 Claims. (Cl. 280—33.4)

This invention relates to trailers of the type adapted to be detachably connected to a vehicle for hauling merchandise of any nature, and more particularly to a three-point suspension trailer having spaced apart universal connections to the driven vehicle.

One of the prime objects of the invention is to design a trailer having a swiveled wheel support so that it backs up, turns as a unit with the vehicle to which it is attached, and in fact operates as an integral extension of the driving vehicle.

Another object of the invention is to design a trailer which can be easily and quickly attached or removed, which tracks at all speeds, and is at all times in perfect alignment with the body of the vehicle to which it is attached.

A further object is to design a trailer which does not sway at high speeds, which operates smoothly on all types of roads, and which can be easily and quickly attached or detached.

A still further object is to provide a trailer composed of few parts, which has ample load area and capacity, and which is extremely economical to manufacture and assemble.

The above and other objects will appear as the specification progresses, reference being had to the accompanying drawings, in which I have shown the preferred embodiments of my invention, and in which like reference numerals indicate like parts throughout the several views thereof.

In the drawings—

Fig. 1 is a side elevation of my improved trailer showing it attached to an automotive vehicle.

Fig. 2 is a fragmentary top plan view, the broken lines showing the caster in various positions.

Fig. 3 is an enlarged sectional view of the spring mounting and assembly.

Fig. 4 is a view similar to Fig. 3, showing the spring compressed.

Fig. 5 is a side view of the universal coupling mechanism.

Fig. 6 is a top plan view of the coupling mechanism, parts being broken away to show the construction details.

Fig. 7 is an enlarged fragmentary side view taken on the line 7—7 of Fig. 8, showing a dual caster and a slightly modified mounting.

Fig. 8 is a rear view thereof.

Fig. 9 is a view similar to Fig. 7, showing a single caster and a dual spring mounting.

Fig. 10 is a fragmentary rear view thereof.

Referring now to the drawings in which I have shown several embodiments of my invention, I shall first describe the arrangement shown in Figs. 1, 2, 3, and 4 of the drawings, and which comprises a caster or wheel member 12 made up in any desired manner and equipped with a pneumatic tire 13 as usual. This caster 12 is provided with a spindle 14 as usual, and the spindle is mounted in the fork 15 in the conventional manner, nuts 16 being provided on the threaded ends of the spindle for securing the caster in position.

A stem 17 can be cast integral with the fork, or can be formed as a separate member and attached thereto if desired, and it will be noted that the forks are curved so that the caster or wheel is considerably offset from the vertical center of the stem, so that it readily trails and swivels in turning or backing up.

The stem is formed with an enlarged section 18 directly adjacent the fork, the upper section 19 being reduced, the end 20 being shouldered and threaded to receive the washer and nut 21 as usual.

The trailer frame 22 is preferably formed of channel members, all joints being welded, said frame being suitably reinforced to form a rigid unitary structure, and includes the spaced apart transversely disposed channels 23. A cast guide plate or spring seat 24 is fitted against the lower flange of the channels 23 and is provided with a centrally disposed opening adapted to accommodate the stem 17, a similar plate 25 extending over the top flange of the channels, and bolts 26 serve to secure these plates rigidly together, a washer 27 being slidably mounted on the stem section 19, and a spring 28 is interposed between the said washer and top plate 25, and it will be obvious that as the trailer is loaded, that the spring will be compressed (see Fig. 4) in the conventional manner, so that the trailer will operate smoothly on all types of roads.

The body 29 can be of any suitable or required design—either round, square, or any other desired shape, and can be formed of any desired material.

The front ends of the channel frame 22 project beyond the body as shown at 30, and a coupling strap 31 is rigidly bolted thereto by means of bolts 32, the outer end of said strap being formed with a cup shaped socket 33 as shown. A similar coupling strap 34 is secured to the strap 31 by means of the bolt 35, and a spring washer 36 is interposed between the nut and the strap, so that a certain degree of resiliency is secured and to eliminate noise and chattering, the outer end of this strap 34 being formed with a similar socket 36, the opposite end being bent outwardly and is slotted as at 37 for attachment of a cam lever 38, the end of this lever being notched as at 39 for engagement with the locking spring 40 which is secured to the front end of the body, the head of the lever being cam shaped as clearly shown in Fig. 6 of the drawings, and when in locked position engages the face of the strap 31, definitely spacing the straps from each other and preventing disengagement of the coupling.

In Figs. 7 and 8 of the drawings, I have shown a modified arrangement embodying a dual caster mounting. This comprises the bracket 43 which is secured to the channel members 23 by bolts 44 as usual, a stem 45 being mounted in said bracket, the upper end being threaded to receive the nut 46 as usual, the lower end being reduced and projecting into a swivel member 47. A groove 48 is also provided intermediate the length of the stem, and a set screw 49 is mounted in the bracket and frictionally engages the groove to prevent shimmying of the caster. An outwardly projecting arm 50 is cast integral with the member 47, the extreme end being disposed at an angle and is formed with a tubular projection 51 adapted to receive and accommodate one end of the coil spring 52.

A curved fork 53 is pivotally secured to the swivel member 47 by means of the bolt 54, said bolt projecting through the lower end of the stem 45 so that a free swiveling action is provided, the set screw 49 being set to provide the necessary "drag". The lower end of the fork 53 is yoke shaped as shown at 55, and a bolt 56 serves to pivotally secure said yoke to the axle 57 on which the casters "B" and "C" respectively are journaled.

A cylindrical extension 58 is cast integral with the fork 53 and accommodates the lower end of the spring 52, and it will be obvious that as the casters travel over rough roads or obstacles, that the fork will pivot on the bolt 54, and the spring 52 will be compressed between the arm 50 and the fork, cushioning the shocks and providing easy riding qualities.

In Figs. 9 and 10 of the drawings I have shown another slight modification. This is substantially the same as the construction shown in Figs. 7 and 8, excepting that the swivel member 47 is provided with a pair of outwardly diverging arms 59 adapted to accommodate the springs 60. The fork 53 is also formed with spaced apart legs 61 and 62 respectively, similar to the construction shown in Fig. 1, offset spring rests 63 being provided on each fork to accommodate the lower end of the springs. The caster "D" is mounted in the same manner, and the action is otherwise the same.

I wish to direct particular attention to the fact that in the construction shown in Figs. 7 and 10 inclusive the fork is pivotally connected to the member 47, and that the member 47 is freely revoluble so that the caster has a free swiveling action.

From the foregoing description it will be obvious that I have perfected a very simple, practical, and economical three-point suspension trailer for general utility purposes.

What I claim is:

1. A trailer having a rigid frame adapted to be attached to a power vehicle and provided with a bracket rigidly secured to said frame, a fork revolubly mounted on the bracket and formed with a shouldered stem, a laterally projecting arm mounted on the stem, resilient means interposed between the free end of the arm and the fork, and a wheel journaled on said fork.

2. A trailer having a rigid frame adapted to be attached to a power vehicle, and provided with a bracket clamped to the frame, a rearwardly curved fork and arm assembly revolubly mounted in the bracket, an angularly disposed spring interposed between the fork and the outer end of the arm, and a wheel journaled on the lower end of the forked stem.

3. A trailer having a rigid frame adapted to be attached to a power vehicle and provided with a guide member, a stem revolubly journaled therein, a laterally projecting arm mounted on the stem, a trailing wheel fork pivotally secured to the stem, a spring seat on the fork at a point intermediate its length, resilient means interposed between the spring seat and the projecting arm, and a ground engaging wheel journaled on the lower end of the fork.

4. A trailer having a frame adapted to be attached to a power vehicle and provided with a bracket rigidly secured thereto, a stem revolubly mounted on the bracket, frictional means engaging said stem for retarding the swiveling action thereof, a laterally projecting overhanging arm mounted on the stem, a rearwardly curved wheel fork pivotally connected to the stem, resilient means interposed between the end of the overhanging arm and the fork, and a ground engaging wheel mounted on said fork.

5. A trailer having a frame adapted to be attached to a vehicle and provided with a bracket, a vertical stem revolubly journaled therein, adjustable means for retarding the swiveling action of the stem, a substantially laterally projecting arm on the stem, a rearwardly curved fork pivotally connected to the lower end of the stem, a spring seat on said fork, a spring interposed between the spring seat and the end of said arm, and a ground engaging wheel mounted on the lower end of the fork.

6. A trailer having a frame adapted to be attached to a vehicle and provided with a bracket, a stem revolubly journaled therein, means for retarding the revolving movement of the stem, a laterally projecting overhanging arm mounted on said stem and provided with a spring seat thereon, a wheel fork pivotally connected to the lower end of the stem, a spring seat on the stem at a point intermediate its length, an angularly disposed spring interposed between and accommodated by said arm and fork spring seats respectively, and ground engaging wheels mounted on said fork.

7. A trailer having a frame adapted to be attached to a vehicle and including a bracket, an arm revolubly associated therewith, a pivoted fork also revolubly associated with the bracket, a ground engaging wheel mounted on the fork, and resilient means interposed between the free end of the arm and said fork.

8. A trailer having a frame adapted to be attached to a vehicle and including a bracket, a laterally projecting arm revolubly associated therewith, a rearwardly curved fork also revolubly associated with the bracket and mounted to pivot in a horizontal plane, a spring interposed between the end of the arm and said fork, and a ground engaging wheel mounted on the free end of said fork.

ALEXIS R. PRIBIL.